United States Patent
Cui et al.

(10) Patent No.: US 12,197,195 B2
(45) Date of Patent: Jan. 14, 2025

(54) MATERIAL SCHEDULING METHOD AND DEVICE OF SEMICONDUCTOR PROCESSING EQUIPMENT

(71) Applicant: BEIJING NAURA MICROELECTRONICS EQUIPMENT CO., LTD., Beijing (CN)

(72) Inventors: Lin Cui, Beijing (CN); Sixue Shi, Beijing (CN); Muya Liu, Beijing (CN)

(73) Assignee: BEIJING NAURA MICROELECTRONICS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/557,333

(22) PCT Filed: Mar. 28, 2022

(86) PCT No.: PCT/CN2022/083292
§ 371 (c)(1),
(2) Date: Oct. 26, 2023

(87) PCT Pub. No.: WO2022/227975
PCT Pub. Date: Nov. 3, 2022

(65) Prior Publication Data
US 2024/0210926 A1 Jun. 27, 2024

(30) Foreign Application Priority Data
Apr. 27, 2021 (CN) .......................... 202110457592.X

(51) Int. Cl.
*G05B 19/418* (2006.01)

(52) U.S. Cl.
CPC .................. *G05B 19/41865* (2013.01); *G05B 2219/32252* (2013.01); *G05B 2219/45031* (2013.01)

(58) Field of Classification Search
CPC .... G05B 19/41865; G05B 2219/32252; G05B 2219/45031
See application file for complete search history.

(56) References Cited

U.S. PATENT DOCUMENTS

| | | | |
|---|---|---|---|
| 2002/0198757 A1 | 12/2002 | Hegde et al. | |
| 2003/0171972 A1* | 9/2003 | Heskin | G06Q 10/0631 705/7.12 |

FOREIGN PATENT DOCUMENTS

| | | |
|---|---|---|
| CN | 101751025 A | 6/2010 |
| CN | 108805325 A | 11/2018 |

(Continued)

OTHER PUBLICATIONS

The World Intellectual Property Organization (WIPO) International Search Report for PCT/CN2022/083292 Jun. 17, 2022 8 Pages (including translation).

*Primary Examiner* — Michael W Choi
(74) *Attorney, Agent, or Firm* — ANOVA LAW GROUP, PLLC

(57) ABSTRACT

Embodiments of the present disclosure provide a material scheduling method and a material scheduling device for semiconductor processing equipment. The method includes establishing a material list, establishing a first scheduling task list according to process recipes and the material list, and inputting the first scheduling task list into a solver to calculate and output a scheduling result with shortest time for performing all material scheduling tasks in the first scheduling task list and parsing the scheduling result to obtain a movement sequence of all materials. In the technical solutions of the material scheduling method and the (Continued)

material scheduling device for the semiconductor processing equipment of embodiments of the present disclosure, the overall scheduling result can be improved, and the calculation speed can be improved. Thus, the scheduling result can be obtained in real-time.

9 Claims, 6 Drawing Sheets

(56) References Cited

FOREIGN PATENT DOCUMENTS

| | | |
|---|---|---|
| CN | 109034596 A | 12/2018 |
| CN | 109934393 A | 6/2019 |
| CN | 112987674 A | 6/2021 |
| JP | 2007102435 A | 4/2007 |
| JP | 2015005085 A | 1/2015 |
| TW | I291665 B | 7/2007 |
| TW | 202008226 A | 2/2020 |

* cited by examiner

MATERIAL SCHEDULING METHOD AND DEVICE OF SEMICONDUCTOR PROCESSING EQUIPMENT

CROSS-REFERENCE TO RELATED APPLICATIONS

This application is a national phase entry under 35 U.S.C. § 371 of International Application No. PCT/CN2022/083292, filed on Mar. 28, 2022, which claims priority to Chinese Application No. 202110457592.X filed on Apr. 27, 2021, the entire contents of both of which are incorporated herein by reference.

TECHNICAL FIELD

The present disclosure generally relates to the semiconductor manufacturing field and, more particularly, to a material scheduling method and a material scheduling device of semiconductor processing equipment.

BACKGROUND

During the process of processing a plurality of materials (e.g., wafers) using semiconductor processing equipment, each material needs to be transferred from a loading/unloading position into a processing chamber according to a determined path for processing. The material returns to the loading/unloading position after the processing. A plurality of materials may need to be scheduled at the same time.

To optimize material scheduling, the existing material scheduling method applies an enumeration method based on a search tree. Specifically, the method includes exhaustively listing all possible movement orders of the material in a search tree method according to the determined material transfer path and component parameters (e.g., manipulator transfer time) of the equipment and selecting a branch with a shortest time from the search result as the movement order of the material. However, since the overall search consumes a significant amount of time, it is impossible to obtain an optimal scheduling result in real-time.

Another material scheduling method includes an N-step segment scheduling strategy. That is, a search range including N steps of the movement of the material can be defined. The material scheduling result within the N steps can be simulated using a determined algorithm, and the material scheduling result can be rated. Then, the optimal path is selected according to the rating result as the movement order of the material. However, since the method is not the global search, only the local optimal scheduling result can be obtained and cannot be guaranteed to be the global optimal scheduling result. In some embodiments, the resource can be wasted, which reduces the capacity of the equipment.

SUMMARY

The present disclosure aims to address at least one technical problem in the existing technology and provides a material scheduling method and a material scheduling device for semiconductor processing equipment, which can obtain an overall optimal scheduling result and improve a calculation speed to obtain the optimal scheduling result in real-time.

To realize the purpose of the present disclosure, a material scheduling method for semiconductor processing equipment is provided. The material scheduling method includes:

S1, establishing a material list, wherein the material list includes a plurality of material groups corresponding to a plurality of different process recipes, and each material group includes a plurality of materials, the plurality of materials are divided into a plurality of material subgroups, and each material group includes at least one material;

S2, establishing a first scheduling task list according to the process recipes and the material list, wherein the first scheduling task list includes a plurality of material scheduling task groups, the material groups have a one-to-one correspondence with the material scheduling task groups, each material scheduling task group includes a plurality of material scheduling task subgroups, the material groups has a one-to-one correspondence with the material scheduling task subgroups, and each material scheduling task subgroup includes at least one material scheduling task; and S3, inputting the first scheduling task list to a solver to calculate and output an optical scheduling result with a shortest time required for performing all material scheduling tasks in the first scheduling task list and parse the optical scheduling result to obtain a movement sequence of all the materials.

In some embodiments, step S3 includes:

S31, selecting a determined number of material scheduling task subgroups from the first scheduling task list according to a first predetermined rule to form a second scheduling task list;

S32, deleting the selected material scheduling task subgroups from the first scheduling task list;

S33, inputting the second scheduling task list to the solver, calculating and outputting a local scheduling result with shortest time required for performing all material scheduling tasks in the second scheduling task list by the solver, and parsing the local scheduling result to obtain a sub-movement sequence of all materials in the second scheduling task list;

S34, setting an ending time point corresponding to a material scheduling task subgroup that finishes first in the local scheduling result as a feeding time point, selecting a portion of the sub-movement sequence before the feeding time point as an output sequence, and storing the output sequence;

S35, determining whether a material scheduling task subgroup remains in the first scheduling task list, if the material scheduling task subgroup remains, performing step S36, and if the material scheduling task subgroup does not remain, performing step S38;

S36, deleting the material scheduling task subgroup that finishes first from the second scheduling task list;

S37, according to a second predetermined rule, re-selecting a material scheduling task subgroup from the first scheduling task list and inserting the re-selected material scheduling task subgroup into the second scheduling task list, and then returning to step S32; and S38, combining the current sub-movement sequence and all previously stored output sequences into the movement sequence.

In some embodiments, the first predetermined rule includes:

selecting a same number of material scheduling task subgroups from each material scheduling task group;

wherein the number of material scheduling task subgroups selected from each material scheduling task group is equal to a ratio of the determined number to the number of process recipes.

In some embodiments, the second predetermined rule includes:

selecting a material scheduling task subgroup from the material scheduling task group corresponding to the material scheduling task subgroup that finishes first in the first scheduling task list and inserting the material scheduling task subgroup into the second scheduling task list at an end of the material scheduling task subgroup that belongs to the same material scheduling task group with the material scheduling task subgroup that finishes first; and if no material scheduling task subgroup exists in the material scheduling task group corresponding to the material scheduling task subgroup that finishes first in the first scheduling task list, selecting a material scheduling task subgroup from a material scheduling task group corresponding to other material scheduling task subgroups in the second material list and inserting the material scheduling task subgroup into the second material list at an end of the material scheduling task subgroup that belongs to a same material scheduling task group in the second material scheduling list with the material scheduling task subgroup.

In some embodiments, the plurality of material scheduling tasks in each material scheduling task subgroup include a processing tasks for processing a material and a transfer task for transferring a material;

in step S34, in the local scheduling result, at the ending time point of the material scheduling task subgroup that finishes first, if an unfinished transfer task exists in another material scheduling task subgroup, an ending time point for finishing all transfer tasks is set as a feeding time point; and if no unfinished transfer task exists in other material scheduling task subgroups, the ending time point of the material scheduling task subgroup that finishes first is set as the feeding time point.

In some embodiments, the material scheduling method further includes:

accumulating a number of times of performing material scheduling tasks that are processing tasks in the material scheduling task subgroups in a same material scheduling task group in various processing chambers;

determining whether the accumulated number of times of the various processing chambers reaches a predetermined maximum number of times in a processing recipe corresponding to the material scheduling task group; and if the accumulated number of times reaches the predetermined maximum number of times, inserting a material scheduling task that is a chamber cleaning task into a corresponding position in the material scheduling task group.

In some embodiments, the plurality of material scheduling tasks in the material scheduling task subgroup include a processing task for processing a material and a transfer task for transferring a material; and in step S3, restricted conditions of a mathematical model used by the solver to calculate the optimal scheduling result includes that:

a duration between an ending time point and a starting time point of each processing task is equal to a sum of material processing time and residence time of a material in a processing chamber;

for any two neighboring material scheduling tasks in each material scheduling task group, a starting time point of a material scheduling task behind is an ending time point of a material scheduling task in front;

only one processing task is performed in each processing chamber in a same period;

if processing chambers corresponding to the plurality of processing tasks in each material scheduling task subgroup have a parallel processing relationship, each processing task corresponds to a processing chamber;

the transfer task is a fetch task or a place task of the material, and fetch tasks and place tasks of the materials in the same material scheduling task subgroup are performed by a same robot;

for the same processing chamber, a starting time point of a place task of a material is later than an ending time point of a fetch task of a previous material; and in the same period, the robot configured to transfer the material has only one arm to perform the fetch task or the place task.

In some embodiments, step S1 includes:

S11, assigning the plurality of materials according to different cassettes;

S12, dividing materials in a same cassette into a plurality of material groups according to the different process recipes;

S13, dividing materials in a same material group into a plurality of material subgroups according to a predetermined rule.

In some embodiments, the predetermined rule includes:

dividing the materials in the same material group into the plurality of material subgroups according to whether processing chambers have a parallel or serial relationship and whether the processing chambers activate a disable function;

wherein:
the parallel relationship refers to that the processing chambers perform the processing simultaneously;
the serial relationship refers to that the processing chambers perform the processing in a determined sequence;
the disable function refers to that at least one processing position is disabled in a processing chamber in a period.

As another technical solution, embodiments of the present disclosure further provide a material scheduling device for semiconductor processing equipment, including:

a material list module configured to establish a material list, wherein the material list includes a plurality of material groups corresponding to a plurality of different process recipes, and each material group includes a plurality of materials, the plurality of materials are divided into a plurality of material subgroups, and each material group includes at least one material;

a scheduling list module configured to establish and output a first scheduling task list according to the process recipes and the material list, wherein the first scheduling task list includes a plurality of material scheduling task groups, the material groups have a one-to-one correspondence with the material scheduling task groups, each material scheduling task group includes a plurality of material scheduling task subgroups, the material groups has a one-to-one correspondence with the material scheduling task subgroups, and each material scheduling task subgroup includes at least one material scheduling task; and a solver configured to input the first scheduling task list to a solver to calculate and output an optical scheduling result with a shortest time required for performing all material scheduling tasks in the first scheduling task list and parse the optical scheduling result to obtain a movement sequence of all the materials.

The present disclosure has the following beneficial effects.

The technical solutions of the material scheduling method and the material scheduling device for the semiconductor processing equipment of embodiments of the present disclosure include, S1, establishing the material list, wherein the material list includes the plurality of material groups corresponding to the plurality of different process recipes, the plurality of materials of each material group are divided into the plurality of material subgroups, and each material group includes at least one material, S2, establishing the first scheduling task list according to the process recipes and the material list, wherein the first scheduling task list includes a plurality of material scheduling task groups, the material groups has the one-to-one correspondence with the material scheduling task groups, each material scheduling task group includes the plurality of material scheduling task subgroups, the material groups has the one-to-one correspondence with the material scheduling task subgroups, and S3, inputting the first scheduling task list to a solver to calculate and output an optical scheduling result with a shortest time required for performing all material scheduling tasks in the first scheduling task list and parse the optical scheduling result to obtain a movement sequence of all the materials. In the material scheduling method of embodiments of the present disclosure, the first scheduling task list that can be calculated and parsed by the solver can be obtained through step S1 and step S2. Then, in step S3, the optimal scheduling result can be calculated based on the solver and can be compared to the enumeration method based on the search tree to obtain the overall optimal scheduling result. Moreover, the solver can directly obtain and output the result by only inputting the related parameters into the solver, which saves many intermediate processes. Thus, the calculation speed can be improved to obtain the optical scheduling result in real-time attainment.

DETAILED DESCRIPTION OF THE EMBODIMENTS

To cause those skilled in the art better understand the technical solutions of the present disclosure, a material scheduling method and a material scheduling device of semiconductor processing equipment of embodiments of the present disclosure are described in detail below in connection with the accompanying drawings.

Figure 1:
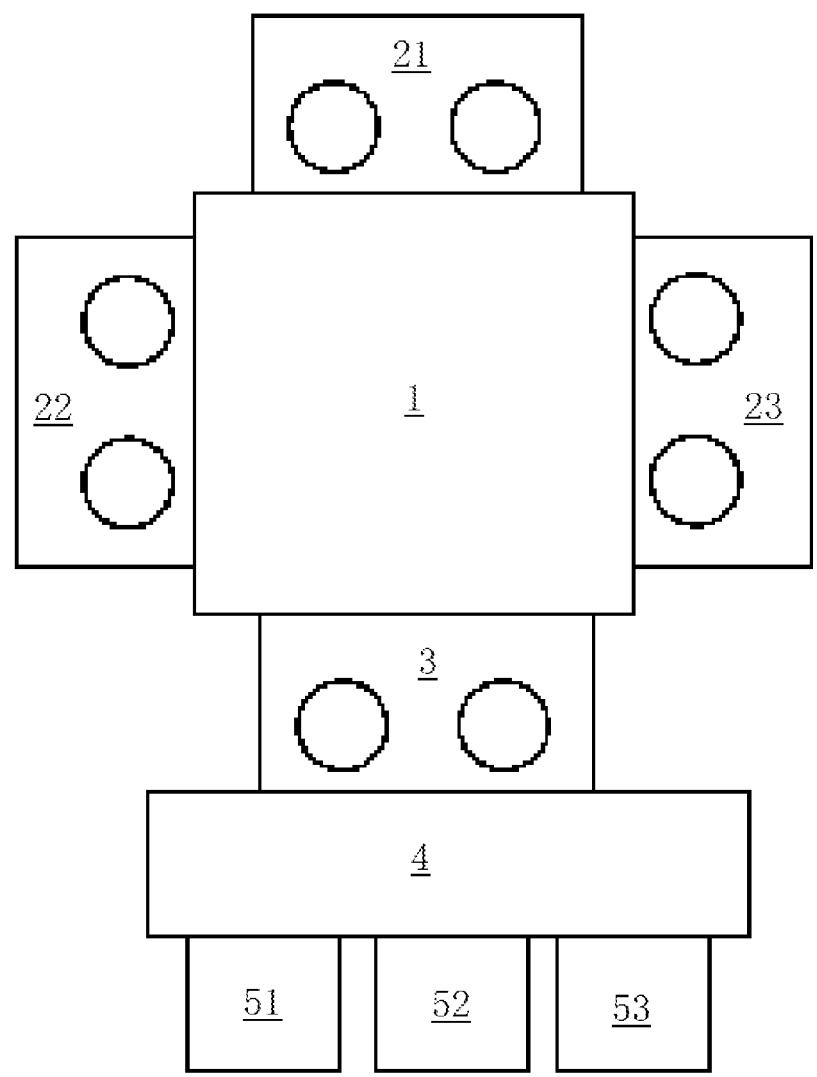
FIG. 1 illustrates a schematic structural diagram of semiconductor processing equipment according to an embodiment of the present disclosure.
Figure 2:
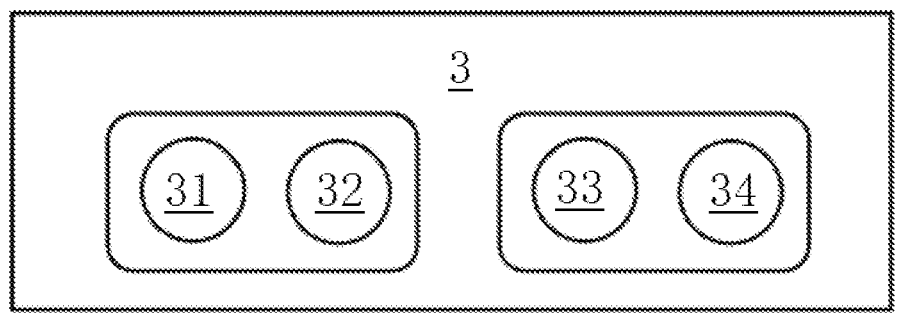
FIG. 2 illustrates a schematic structural diagram of a loading and unloading chamber of the semiconductor processing equipment according to an embodiment of the present disclosure.

The semiconductor processing equipment can be configured to process a material (e.g., a wafer). FIG. 1 and FIG. 2 show semiconductor processing equipment for materials, such as wafers. In this example, semiconductor processing equipment for a glue removal process. The semiconductor processing equipment can be, for example, cluster type equipment. In some embodiments, the equipment includes a transfer chamber 1, three processing chambers (21, 22, and 23), a loading/unloading chamber (Load Lock) 3, a transition chamber 4, and three loading/unloading positions (51, 52, and 53).

The three processing chambers (21, 22, and 23) can be arranged around the transfer chamber 1 and can be configured to process the material. Each processing chamber can include two processing positions. The two processing positions can be used for processing simultaneously, or one of the processing position can be disabled in a same period, and only the other one of the processing positions can be used for processing independently. The disabled method can be referred to as ST disable. In some embodiments, the relationship among the plurality of processing chambers that can be used for processing simultaneously can be referred to as a parallel relationship. In this situation, the material can enter any one of the processing chambers for processing. The relationship among the plurality of processing chambers for processing in a determined sequence can be referred to as a serial relationship. In this situation, the material may need to enter the plurality of processing chambers for processing according to the determined path in the determined sequence.

A vacuum transfer robot (VTR) can be arranged in the transfer chamber 1 and configured to transfer the material between the processing chambers and the loading/unloading chamber 3. The VTR can include two arms (Dirty hand and Clean hand). Each arm can include two wafer fetch positions, four wafer fetch positions in total. The Dirty hand can be configured to grip an unprocessed material, and the Clean hand can be configured to grip processed material.

As shown in FIG. 2, two cooling positions (31 and 33) and two alignment positions (32 and 34) are arranged in the load lock 3. An aligner station can be configured to perform position calibration on the material before the material is transferred into the processing chamber. Each aligner station can accommodate a material. A buffer station can be configured to cool the material after the material in the processing chamber is processed, and before the material returns to the loading/unloading position.

An atmospheric transfer robot (ATR) can be arranged in the transition chamber 4 and configured to transfer the material among the load lock 3 and the loading/unloading positions.

The three loading/unloading positions (51, 52, 53) can be configured to carry cassettes. Each cassette can include a plurality of materials (for example, up to 25 materials).

In the process of using the semiconductor processing equipment above to process the plurality of materials, each material may need to be transferred into the processing chamber for processing from the loading/unloading position according to the determined path and may be returned to the loading/unloading position after the processing is finished. Thus, the material scheduling needs to be optimized to appropriately use the members of the semiconductor processing equipment to achieve the purpose of processing many materials in a unit time.

Figure 3:
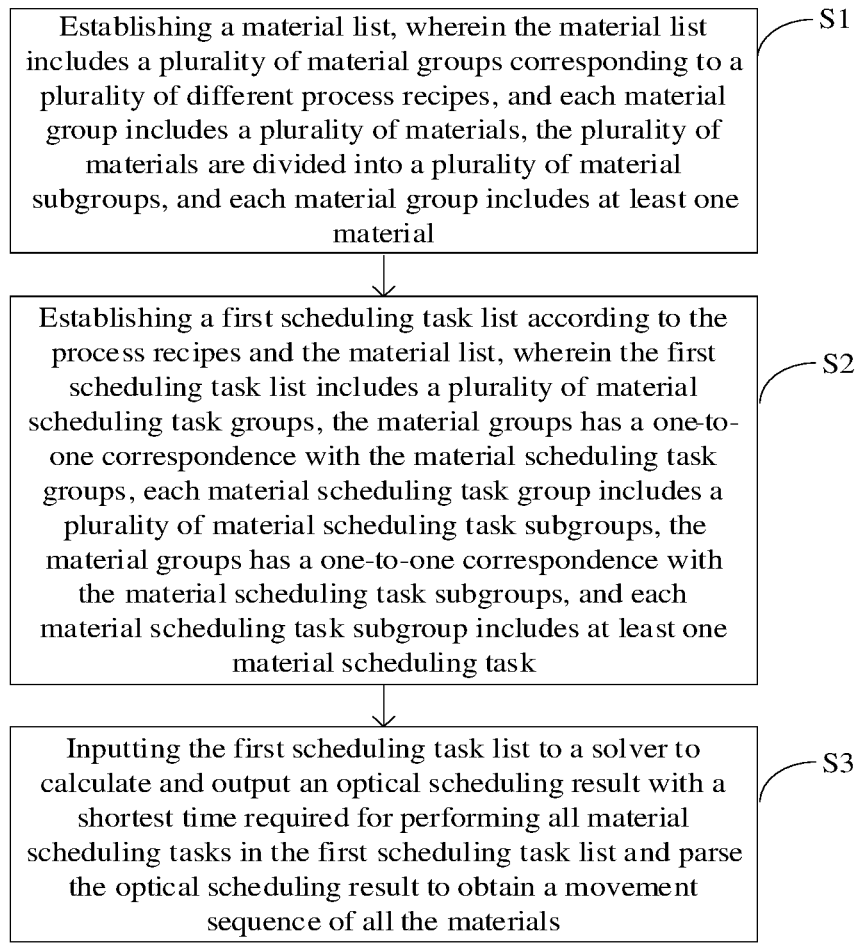
FIG. 3 illustrates a schematic flowchart of a material scheduling method of semiconductor processing equipment according to an embodiment of the present disclosure.

To achieve this purpose, a first embodiment of the present disclosure provides a material scheduling method of the semiconductor processing equipment. As shown in FIG. 3, the method includes the following steps.

At S1, a material list is established.

The material list can include material groups corresponding to different process recipes. Each material group can include a plurality of materials. The plurality of materials can be divided into a plurality of material subgroups. Each material subgroup can include at least one material.

Figure 4:
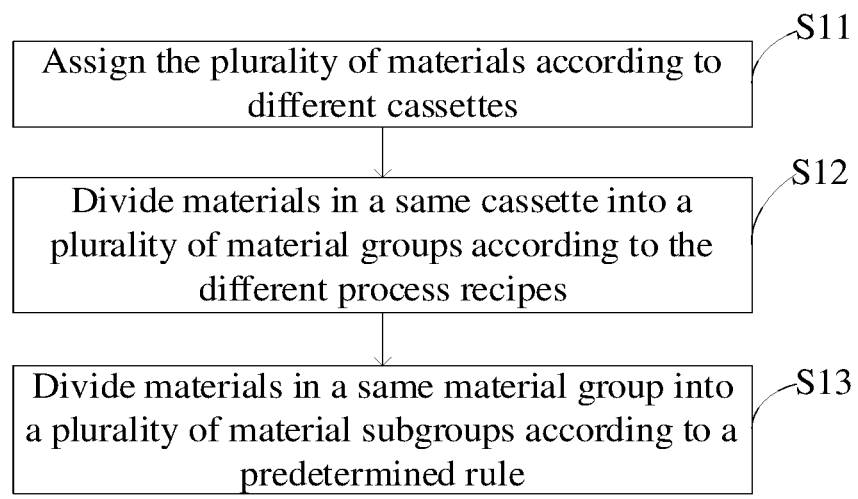
FIG. 4 illustrates a schematic flowchart of step S1 according to an embodiment of the present disclosure.

In some embodiments, as shown in FIG. 4, step S1 includes the following steps.

At S11, the plurality of materials are assigned to different cassettes.

For example, as shown in FIG. 1, the three loading/unloading positions (51, 52, and 53) can each carry a cassette. Each cassette can be assigned with a plurality of materials (e.g., up to 25). The materials in each cassette can have a cassette number.

At S12, the materials in the same cassette are divided into a plurality of material groups according to different process recipes.

That is, the plurality of materials in the same material group can adopt a same process recipe, and each material can have a material group number. The plurality of materials in different material groups can adopt different process recipes.

At S13, the plurality of materials in the same material group are divided into a plurality of material subgroups according to a predetermined rule.

The predetermined rule for the material subgroups can be determined based on specific conditions. For example, the predetermined rule can include:

according to whether the processing chambers have the parallel relationship or the serial relationship and whether the processing chambers start the disable function, dividing the plurality of materials in the same material group into the plurality of material subgroups;

where the parallel relationship refers to that the plurality of processing chambers perform processing simultaneously, the serial relationship refers to that the plurality of processing chambers perform processing in a determined sequence, and the disable function refers to that at least one processing position in the processing chamber is disabled in a period, i.e., ST disable.

Taking that the processing chamber includes two processing positions as an example, if a processing position in a processing chamber is ST disabled, the quantity of materials that is assigned to the processing chamber for processing can be 1. If the processing chamber is not ST disabled, the quantity of the materials assigned to the processing chamber for processing can be 2.

By taking the three processing chambers (21, 22, and 23) shown in FIG. 1 as an example, assume that processing chambers 21 and 22 are not ST disabled, and processing chamber 23 is ST disabled, if the plurality of processing chambers have the parallel relationship, the three processing chambers (21, 22, and 23) can simultaneously perform processing. Thus, the materials in each material group can enter any one of the processing chambers for processing. In this situation, assume that each material group includes 10 materials (numbered 1 to 10), the 10 materials can be equally divided into 6 material subgroups, i.e., (1,2, PM21), (3,4, PM22), (5, PM23), (6,7, PM21), (8,9, PM22), (10, PM23), where PM denotes the processing chamber. During the processing, two materials numbered 1 and 2, two materials numbered 3 and 4, and one material numbered 5 can enter the three processing chambers (21, 22, and 23) for processing simultaneously. After processing, two materials numbered 6 and 7, two materials numbered 8 and 9, and one material numbered 10 can enter the three processing chambers (21, 22, and 23) for processing simultaneously.

Assume that processing chambers 21 and 22 are ST disabled, if the plurality of processing chambers have the serial relationship, the two processing chambers (21 and 22) perform processing in sequence. In this situation, assume each material group includes 6 materials (numbered 1 to 6), the 6 materials can be divided equally into 3 material subgroups, i.e., (1,2, PM21-PM22), (3,4, PM21-PM22), and (5,6, PM21-PM22). During processing, two materials numbered 1 and 2 can enter the processing chamber 21 for processing and then enter the processing chamber 22 for processing. After the processing is completed, the two materials numbered 3 and 4 can enter the processing chamber 21 for processing and then enter the processing chamber 22 for processing. After the processing is completed, the two materials numbered 5 and 6 can enter the processing chamber 21 for processing and then enter the processing chamber 22 for processing.

Assume that the processing chamber 21 is not ST disabled, if the plurality of processing chambers have the serial relationship, only the processing chamber 21 can perform processing. In this situation, assume that each material group includes 6 materials (numbered 1 to 6). The 6 materials can be evenly divided into 3 material subgroups, i.e., (1,2, PM21), (3,4, PM21), and (5,6, PM21). During processing, the two materials numbered 1 and 2 can enter the processing chamber 21 for processing. After the processing is completed, the two materials numbered 3 and 4 can enter the processing chamber 21 for processing. After the processing is completed, the two materials numbered 5 and 6 can enter the processing chamber 21 for processing.

At S2, a first scheduling task list is established according to the above process recipes and the material list.

The first scheduling task list can include a plurality of material scheduling task groups. The material groups and the material scheduling task groups can have a one-to-one correspondence. Each material scheduling task group can include a plurality of material scheduling task subgroups. The material subgroups and the material scheduling task subgroups can have a one-to-one correspondence. Each material scheduling task subgroup can include at least one material scheduling task.

A process recipe can include a plurality of steps. Each step can correspond to one machine in the semiconductor processing equipment and correspond to one material scheduling task. The task can include information about the machine used for processing and the processing time (including a starting time point and an ending time point).

The material scheduling task group corresponding to the material group can be referred to as PJob. The material scheduling task subgroup corresponding to each material subgroup of each Pjob can be referred to as ScheduleJob. The material scheduling tasks of the ScheduleJob can be referred to as tasks. The tasks can include information about the machines used in sequence by the materials in the same material subgroup and the processing time of the machines (including the starting time point and the ending time point). Thus, Each PJob can include a plurality of ScheduleJobs. Each ScheduleJob can include at least one task.

In addition, a cassette task group corresponding to the materials in the same cassette can be referred to as CJob. A plurality of PJobs can be divided according to different process recipes in the same CJob. Cassettes of each material of N materials can be numbered with CJob ID. ID=1, 2, . . . , N. Material groups of M materials in the same CJob can be numbered with PJob ID. ID=1, 2, . . . , M. Material groups of R materials in the same PJob can be numbered with ScheduleJob ID. ID=1, 2, . . . . R. Each material can include a CJob ID and a PJob ID. Materials of the same PJob ID can be from the same CJob ID and have the same recipe.

ScheduleJobs can be sorted in a sequence according to the numbering of the ScheduleJob ID. The numbering can be continuous. The first scheduling task list can be formed.

At S3, the above first scheduling task list is input into the solver to output the optimal scheduling result calculated by the solver. The optimal scheduling result is parsed to obtain the movement sequence of all the materials.

The above solver can be configured to establish a mathematical model according to input-related parameters and calculate and output the optimal scheduling result. This optimal scheduling result can minimize the time required to perform all the material scheduling tasks in the first scheduling task list. The optimal scheduling result can include all the scheduling plans for processing the materials by the determined machine in the determined time.

It should be noted that the above solver can be a device for performing the model-solving method, which needs to be used in connection with step S1 and step S2 to cause the solver to perform processing of calculation and parsing on the input-related parameters (i.e., the first scheduling task list). That is, the related parameters that can be processed by the solver can be obtained first using step 1 and step 2. Then, the solver can be used to calculate and output the optimal scheduling result. Since the solver is a known technology, the solver is not repeated here.

In some embodiments, before inputting the above first scheduling task list into the solver, the first scheduling task list can be initialized according to the process recipe. Initialization can refer to converting a storage structure of information about the machines and the processing time (including the starting time point and the ending time point) on the machines included in the material scheduling tasks of the first scheduling task list into the input format of the material scheduling tasks in the solver. After the format conversion, each task can include the information about machine ID and duration, with the task as the scheduling unit. The input format, for example, can be a Json format. The conversion can be performed using a conversion function of a corresponding Json library.

The material scheduling method of embodiments of the present disclosure can obtain the first scheduling task list that can enable the solver to perform the processing such as the calculation and parsing through step S1 and step S2. Then, in step S3, the optimal scheduling result can be calculated based on the above solver. Compared to the enumeration method based on the search tree, in the material scheduling method, the global optimal scheduling result can be obtained, and the solver can directly obtain and output the result by only inputting the related parameters, which saves extensive intermediate processes. Thus, the calculation speed can be improved, and the optimal scheduling result can be obtained in real-time.

In some embodiments, the VTR in the transfer chamber 1 can include two arms. If one of the arms fails, the other one of the arms can continue with the processing to ensure that the production line is not stopped. In this situation, an arm disable function can be used. That is, only one arm can operate.

In some embodiments, if the ATR in the transition chamber 4 uses the arm disable function, assume that one material subgroup includes 2 materials, the ATR may need to transfer twice. Each time the ATR can transfer one material. Thus, the transfer time of the ATR can be twice as much as the time required by a set of transfer actions (including, fetching, rotation, and placing). If the VTR arranged in the transfer chamber 1 uses the arm disable function, only Clean hand can operate. Since the Clean hand has two fetching positions, only one transfer is needed. Each time two materials can be transferred. Thus, the transfer time of the VTR can be the time required by the set of transfer actions (including the fetching, the rotation, and the placing). Based on the above, according to whether the arm uses the arm disable function, the corresponding parameter format (e.g., the duration parameter of the task) can be input to the solver.

In step S3, after obtaining the above optimal scheduling result using the solver, the optimal scheduling result can be parsed to obtain the movement sequence of all the materials. In some embodiments, according to the interface rule, the starting time points and the end time points of all the tasks included in the optimal scheduling result output by the solver can be parsed into the movement sequence (i.e., a move list). Since the material movement action of the movement sequence can include pick move, place move, and process move, the relevant parameters for materials, arms, and machines can be different for different material movement actions. The related parameters can belong to the above interface rule.

In some embodiments, some solvers can have limited computation speeds shown in Table 1 below.

TABLE 1

Time required for some solvers to calculate different quantities of material scheduling task subgroups.

| | Quantity of material scheduling task subgroups | | | | | |
|---|---|---|---|---|---|---|
| 6 | 7 | 8 | 9 | 10 | 11 | 12 |
| Duration (s) 1 | 2 | 3.5 | 8 | 7 | 11 | 156 |

According to Table 1, When the calculation speed is required to meet the condition of obtaining the optimal scheduling result in real-time, the solver cannot calculate all the material scheduling task subgroups included in the first scheduling task list in a short time. That is, if the calculation result needs to be obtained in real-time, the quantity of the material scheduling task subgroups calculated by the solver has to be smaller than the total quantity of the material scheduling task subgroups. For example, in some embodiments, the total quantity of the material scheduling task subgroups included in the first scheduling task list can be 40. According to Table 1, the solver takes 156 s to calculate 12 material scheduling task subgroups. Thus, the solver can take longer time to calculate 40 material scheduling task subgroups, and the optimal scheduling result cannot be obtained in real-time.

To address the above issue, in the material scheduling method of embodiments of the present disclosure, a calculation scope of the solver can be controlled by performing the selection and calculation cyclically. That is, the solver can be configured to calculate a certain quantity of material scheduling task subgroups in batches to ensure that the solver takes a very short time to perform the calculation. Thus, the total time required to calculate all the material scheduling task subgroups can be shortened. Therefore, the optimal scheduling result can be obtained in real-time.

Figure 5:
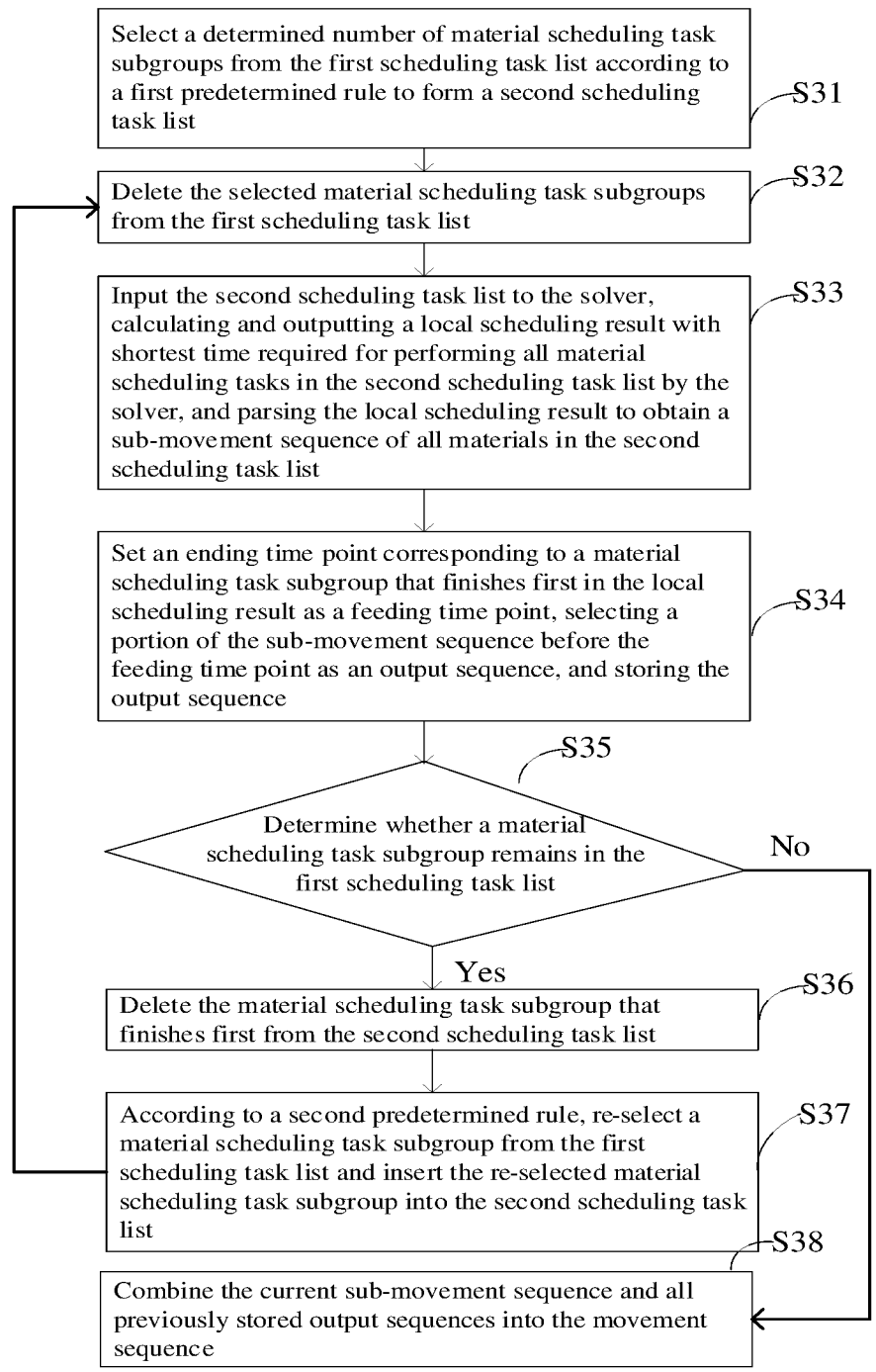
FIG. 5 illustrates a schematic flowchart of step S3 according to an embodiment of the present disclosure.

The selection step and the calculation step performed cyclically can be described in detail below. In some embodiments, step S3 includes the following steps as shown in FIG. 5.

At S31, a determined quantity of material scheduling task subgroups is selected from the first scheduling task list according to the first predetermined rule to form a second scheduling task list.

The determined quantity (referred to as MaxJobNum) should be set to meet the actual requirement for the solver to calculate the quantity of ScheduleJobs. For example, if the determined quantity is 6, as shown in Table 1, the solver takes only 1 s to calculate 6 material scheduling task subgroups, which meets the time requirement for the calculation.

Since the first scheduling task list satisfies that different processing chambers are used for different process recipes in the same period. That is, the material scheduling task groups corresponding to different process recipes can be performed in parallel, and each processing chamber can be only occupied by one material scheduling task group (PJob). Based on this, the first predetermined rule can include selecting the same number of material scheduling task groups (ScheduleJobs) from each material scheduling task group (PJob). Assume that the quantity of the process recipes is N, the quantity of the material scheduling task group (ScheduleJob) selected from the material scheduling task groups (PJob) corresponding to the process recipes can be equal to a ratio between the MaxJobNum and the quantity N of the process recipes, i.e., MaxJobNum/N. When selecting from the material scheduling task groups (PJob) corresponding to the process recipes, if the current quantity of the material scheduling task subgroups (ScheduleJob) of the material scheduling task group (PJob) corresponding to a process recipe is smaller than the quantity that needs to be selected (i.e., MaxJobNum/N), the material scheduling task subgroups (ScheduleJob) of the current quantity can be selected. That is, the material scheduling task subgroups of the material scheduling task group (PJob) can be all selected.

At S32, the selected material scheduling task subgroups are deleted from the first scheduling task list.

At S33, the second scheduling task list (including MaxJobNum ScheduleJobs) is input into the above solver to calculate and output the local scheduling result using the solver. The local scheduling result is parsed to obtain the sub-movement sequence of all the materials in the second scheduling task list.

The local scheduling result can minimize the time required for all the material scheduling tasks in the second scheduling task list.

At S34, the ending time point corresponding to the material scheduling task subgroup that is completed first (i.e., all the material scheduling tasks of the material scheduling task subgroup are completed) in the local scheduling result is set to a feeding time point. A portion of the sub-movement sequence before the feeding time point is filtered and used as the output sequence, and the output sequence is saved.

Since the solver only calculates MaxJobNum ScheduleJobs in step S33, and the actual quantity of ScheduleJobs included in the first scheduling task list is greater than MaxJobNum, to maximize the throughput, feeding cannot wait until the MaxJobNum Schedule Jobs of the last round are performed. That is, new MaxJobNum ScheduleJobs can be fed to ensure that the solver can enter a next round calculation in time. Thus, an optimal feeding time point needs to be selected to feed the MaxJobNum ScheduleJobs in time. Based on this, in the above local scheduling result, an appropriate material scheduling task subgroup can be selected, and the ending time point for completing the material scheduling task subgroup can be used as the feeding time point.

After the feeding time point is determined, the portion of the parsed sub-movement sequence before the feeding time point can be filtered and used as the output sequence. The output sequence can be saved. The portion can be a portion of the sequence of all the material movement actions before the feeding time point included in the sub-movement sequence.

In practical applications, when the solver performs calculation on the second scheduling task list including the selected MaxJobNum ScheduleJobs of a new round, the status of the semiconductor processing equipment at the feeding time point can be used as an initial status to continue to perform calculation on the second scheduling task list to obtain a new output sequence. The new output sequence and the output sequence of the last round can be combined by taking the feeding time point as a dividing line. Thus, the output sequences of all rounds can form a continuous sequence, i.e., the movement sequence of all the materials.

Selecting an optimal feeding time point can be implemented in a plurality of methods. For example, in some embodiments, the plurality of material scheduling tasks of each material scheduling task subgroup (ScheduleJob) can include a processing task for processing the material and a transfer task for transferring the material. That is, some material scheduling tasks can be the processing tasks, and some material scheduling tasks can be the transferring tasks. Thus, in step S34, in the local scheduling result, at the ending time point of the material scheduling task subgroup (ScheduleJob) that is first completed, if a transfer task in another material scheduling task subgroup is not completed, the ending time point for completing all the transfer tasks can be set as the above feeding time point. That is, if a ScheduleJob completes all the tasks first, and all the transfer tasks in other ScheduleJobs are completed, the ending time point of the ScheduleJob can be set as the feeding time point.

If there are no unfinished transfer tasks in the other material scheduling task subgroups, the ending time point of the material scheduling task subgroup (ScheduleJob) that completes the tasks first can be set as the feeding time point.

At S35, whether a material scheduling task subgroup exists in the first scheduling task list is determined. If the material scheduling task subgroup exists in the first scheduling task list, step S36 is performed. If the material scheduling task subgroup does not exist in the first scheduling task list, step S38 is performed.

If no material scheduling task subgroup exists in the first scheduling task list, the first scheduling task list is empty.

At S36, the material scheduling task subgroup in which the tasks are completed first is deleted from the second scheduling task list.

At S37, according to the second predetermined rule, a material scheduling task subgroup is selected from the first scheduling task list, and the newly selected material scheduling task subgroup is inserted into the second scheduling task list. Then, the method returns to step S32.

Step S37 can be used to insert the newly selected ScheduleJob into a corresponding position in the second scheduling task list. The second scheduling task list can include the newly selected ScheduleJob. Then, the method can return to step S32 for a next iteration. When the next iteration proceeds to step S33, the second scheduling task list including the newly selected ScheduleJob can be input into the solver to obtain a new output sequence.

Inserting the newly selected ScheduleJob into the corresponding position in the second scheduling task list of the last round can be implemented in a plurality of methods. For example, the second predetermined rule can include the following processes.

A material scheduling task subgroup (ScheduleJob) can be re-selected from the material scheduling task group (PJob) corresponding to the material scheduling task subgroup in the first scheduling task list in which the tasks are completed first. The material scheduling task subgroup can be inserted into the second scheduling task list at the end of the material scheduling task subgroup belonging to the same material scheduling task group as the material scheduling task subgroup in which the tasks are first completed. That is, the material scheduling task group to which the selected material scheduling task group belongs can be the same type as the inserted material scheduling task group. Moreover, the inserted position can be at the end of all the material scheduling task subgroups in the material scheduling task group.

In the first scheduling task list, the material scheduling task group corresponding to the material scheduling task subgroup in which the tasks are completed first does not have the material scheduling task subgroup. That is, the material scheduling task group corresponding to the material scheduling task subgroup in which the tasks are completed first may be empty. Thus, a material scheduling task subgroup can be selected from the material scheduling task group corresponding to other material scheduling task subgroups in the second material list. Moreover, the material scheduling task subgroup can be inserted into the second material list and at the end of the material scheduling group belonging to the same material scheduling task group as the material scheduling task subgroup.

At S38, the current sub-movement sequence and all the previously stored output sequences are combined to form the movement sequence.

Based on the above, all the output sequences can form a continuous sequence, i.e., the movement sequence of all the materials. The output sequences of two neighboring rounds can be combined by using the feeding time point as the divided line.

In some embodiments, to ensure the cleanliness of the processing chambers, the material scheduling method can further include:

accumulating a number of times of performing material scheduling tasks that are processing tasks for materials in the material scheduling task subgroups of the same material scheduling task group;

determining whether the number of times of the processing chambers reaches a predetermined maximum number of times in the process recipe corresponding to the material scheduling task group; and if the number of times reaches the maximum number of times, inserting the material scheduling task that is the chamber cleaning task into the corresponding position of the material scheduling task group.

It should be noted that there are various types of material scheduling tasks, for example, processing tasks, transfer tasks, and chamber cleaning tasks. Based on this, the number of times of performing the material scheduling tasks that are the processing tasks can be the cumulative number of times performing all the material scheduling tasks that are the processing tasks.

To ensure the normal execution of material scheduling, in some embodiments, in step S3, restricted conditions of the mathematical model used by the solver to calculate the optimal scheduling result above include, but are not limited to, that:

(1) the duration between the ending time point and the starting time point of each processing task is equal to the sum of the material processing time and the residence time of the material in the processing chamber;

(2) for any two neighboring material scheduling tasks in each material scheduling task group, the starting time point of the material scheduling task at the end is the ending time point of the material scheduling task in the front;

(3) only one processing task is performed in each processing chamber in the same period;

(4) if the processing chambers corresponding to the plurality of processing tasks in each material scheduling task subgroup have the parallel processing relationship, each processing task corresponds to a processing chamber;

(5) The transfer task is a fetch task or place task of the material, and the fetch task and place task of the materials in the same material scheduling task subgroup are performed by the same robot;

(6) for the same processing chamber, the starting time point of the place task of each material is later than the ending time point of the fetch task of the previous material; and (7) in the same period, the robot configured to transfer the material has only one arm to perform the fetch task or the place task.

It should be noted that the above restricted conditions can be implemented by various mathematical equations or inequalities in the mathematical model used by the solver. In embodiments of the present disclosure, the meanings of the mathematical equations or inequalities are described above.

Figure 6:
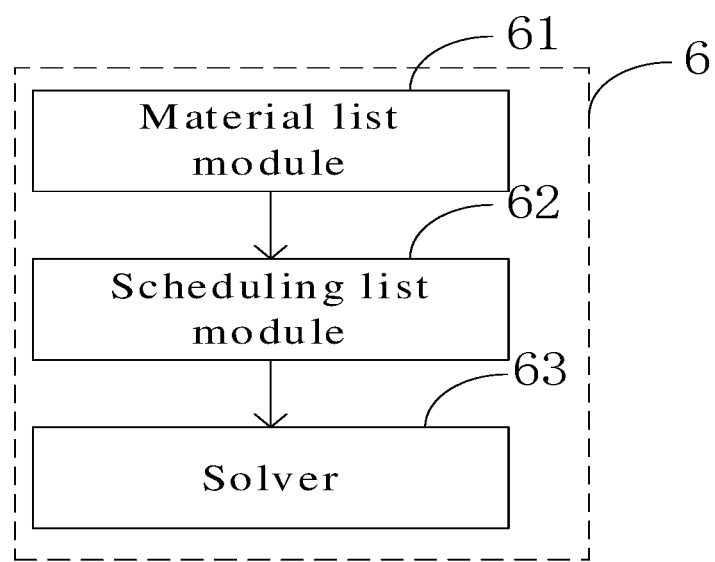
FIG. 6 illustrates a schematic block diagram showing a principle of a material scheduling device of semiconductor processing equipment according to an embodiment of the present disclosure.

A second embodiment of the present disclosure provides a material scheduling device 6. As shown in FIG. 6, the material scheduling device 6 includes a material list module 61, a scheduling list module 62, and a solver 63. The material list module 61 can be configured to create a material list. The material list can include material groups corresponding to a plurality of different process recipes. Each material group can include a plurality of materials. The plurality of materials can be divided into a plurality of material subgroups. Each material subgroup can include at least one material. The scheduling list module 62 can be configured to create and output the first scheduling task list according to the process recipes and the material list. The first scheduling task list can include a plurality of material scheduling task subgroups. The material groups and the material scheduling task groups can have a one-to-one correspondence. Each material scheduling task group can include a plurality of material scheduling task subgroups. The material groups and the material scheduling task subgroups can have a one-to-one correspondence. Each material scheduling task subgroup can include at least one material scheduling task. The solver 63 can be configured to receive the above first scheduling task list, calculate and output the optimal scheduling result with the shortest time used to perform all the material scheduling tasks in the first scheduling task list, and parse this optimal scheduling result to obtain the movement sequence of all the materials.

It should be noted that the above solver 63 can be a device that performs a model-solving method. Since the device belongs to the known technology, the device is repeated here.

In summary, in the technical solutions for the material scheduling method and the material scheduling device of the semiconductor processing equipment of embodiments of the present disclosure, the first scheduling task list that can be calculated and parsed by the solver can be obtained through step S1 and step S2. Then, in step S3, the optimal scheduling result can be calculated based on the solver and can be compared to the enumeration method based on the search tree to obtain the overall optimal scheduling result. Moreover, the solver can directly obtain and output the result by only inputting the related parameters into the solver, which saves many intermediate processes. Thus, the calculation speed can be improved to obtain the optical scheduling result in real-time attainment.

It should be understood that the above embodiments are merely illustrative examples adopted to illustrate the principles of the present disclosure. However, the present disclosure is not limited to this. Those skilled in the art can make various modifications and improvements without departing from the spirit and essence of the present disclosure. These modifications and improvements are also within the scope of the present disclosure.

What is claimed is:

1. A material scheduling method for semiconductor processing equipment, comprising:
    establishing a material list, wherein the material list includes a plurality of material groups corresponding to a plurality of different process recipes, and each material group includes a plurality of materials, the plurality of materials are divided into a plurality of material subgroups, and each material group includes at least one material;
    establishing a first scheduling task list according to the process recipes and the material list, wherein the first scheduling task list includes a plurality of material scheduling task groups, the plurality of material groups has a one-to-one correspondence with the plurality of material scheduling task groups, each material scheduling task group includes a plurality of material scheduling task subgroups, the plurality of material groups has a one-to-one correspondence with the plurality of material scheduling task subgroups, and each material scheduling task subgroup includes at least one material scheduling task; and
    inputting the first scheduling task list to a solver to calculate and output an optical scheduling result with a shortest time required for performing all material scheduling tasks in the first scheduling task list and parse the optical scheduling result to obtain a movement sequence of all the materials including:
        selecting a determined number of material scheduling task subgroups from the first scheduling task list according to a first predetermined rule to form a second scheduling task list;
        deleting the selected material scheduling task subgroups from the first scheduling task list;
        inputting the second scheduling task list to the solver, calculating and outputting a local scheduling result with shortest time required for performing all material scheduling tasks in the second scheduling task list by the solver, and parsing the local scheduling result to obtain a sub-movement sequence of all materials in the second scheduling task list;
        setting an ending time point corresponding to a material scheduling task subgroup that finishes first in the local scheduling result as a feeding time point, selecting a portion of the sub-movement sequence before the feeding time point as an output sequence, and storing the output sequence;
        determining whether a material scheduling task subgroup remains in the first scheduling task list, if the material scheduling task subgroup remains, deleting the material scheduling task subgroup that finishes first from the second scheduling task list, and if the material scheduling task subgroup does not remain, combining the current sub-movement sequence and all previously stored output sequences into the movement sequence;
        deleting the material scheduling task subgroup that finishes first from the second scheduling task list;
        according to a second predetermined rule, re-selecting a material scheduling task subgroup from the first scheduling task list and inserting the re-selected material scheduling task subgroup into the second scheduling task list, and then returning to deleting the selected material scheduling task subgroups from the first scheduling task list; and
        combining the current sub-movement sequence and all previously stored output sequences into the movement sequence.

2. The material scheduling method according to claim 1, wherein the first predetermined rule includes:
    selecting a same number of material scheduling task subgroups from each material scheduling task group;
    wherein the number of material scheduling task subgroups selected from each material scheduling task group is equal to a ratio of the determined number to the number of process recipes.

3. The material scheduling method according to claim 2, wherein the second predetermined rule includes:
    selecting a material scheduling task subgroup from the material scheduling task group corresponding to the material scheduling task subgroup that finishes first in the first scheduling task list and inserting the material scheduling task subgroup into the second scheduling task list at an end of the material scheduling task subgroup that belongs to the same material scheduling task group with the material scheduling task subgroup that finishes first; and
    in response to no material scheduling task subgroup existing in the material scheduling task group corresponding to the material scheduling task subgroup that finishes first in the first scheduling task list, selecting a material scheduling task subgroup from a material scheduling task group corresponding to other material scheduling task subgroups in the second material list and inserting the material scheduling task subgroup into the second material list at an end of the material scheduling task subgroup that belongs to a same material scheduling task group in the second material scheduling list with the material scheduling task subgroup.

4. The material scheduling method according to claim 1, wherein:
    the plurality of material scheduling tasks in each material scheduling task subgroup include a processing tasks for processing a material and a transfer task for transferring a material;
    in the local scheduling result, at the ending time point of the material scheduling task subgroup that finishes first, in response to an unfinished transfer task existing in another material scheduling task subgroup, an ending time point for finishing all transfer tasks is set as a feeding time point; and in response to no unfinished transfer task existing in other material scheduling task subgroups, the ending time point of the material scheduling task subgroup that finishes first is set as the feeding time point.

5. The material scheduling method according to claim 1, further comprising:

accumulating a number of times of performing material scheduling tasks that are processing tasks in the material scheduling task subgroups in a same material scheduling task group in various processing chambers;

determining whether the accumulated number of times of the various processing chambers reaches a predetermined maximum number of times in a processing recipe corresponding to the material scheduling task group; and in response to the accumulated number of times reaching the predetermined maximum number of times, inserting a material scheduling task that is a chamber cleaning task into a corresponding position in the material scheduling task group.

6. The material scheduling method according to claim 1, wherein:

the plurality of material scheduling tasks in material scheduling task subgroup include a processing task for processing a material and a transfer task for transferring a material;

restricted conditions of a mathematical model used by the solver to calculate the scheduling result include that:

a duration between an ending time point and a starting time point of each processing task is equal to a sum of material processing time and residence time of a material in a processing chamber;

for any two neighboring material scheduling tasks in each material scheduling task group, a starting time point of a material scheduling task behind is an ending time point of a material scheduling task in front;

only one processing task is performed in each processing chamber in a same period;

in response to processing chambers corresponding to the plurality of processing tasks in each material scheduling task subgroup having a parallel processing relationship, each processing task corresponds to a processing chamber;

the transfer task is a fetch task or a place task of the material, and fetch tasks and place tasks of the materials in the same material scheduling task subgroup are performed by a same robot;

for the same processing chamber, a starting time point of a place task of a material is later than an ending time point of a fetch task of a previous material; and in the same period, the robot configured to transfer the material has only one arm to perform the fetch task or the place task.

7. The material scheduling method according to claim 1, wherein establishing the material list includes:

assigning the plurality of materials according to different cassettes;

dividing materials in a same cassette into a plurality of material groups according to the different process recipes; and dividing materials in a same material group into a plurality of material subgroups according to a predetermined rule.

8. The material scheduling method according to claim 7, wherein the predetermined rule includes:

dividing the materials in the same material group into the plurality of material subgroups according to whether processing chambers have a parallel or serial relationship and whether the processing chambers activate a disable function;

wherein:

the parallel relationship refers to that the processing chambers perform the processing simultaneously;

the serial relationship refers to that the processing chambers perform the processing in a determined sequence; and the disable function refers to that at least one processing position is disabled in a processing chamber in a period.

9. A material scheduling device for semiconductor processing equipment, comprising:

a material list module configured to establish a material list, wherein the material list includes a plurality of material groups corresponding to a plurality of different process recipes, and each material group includes a plurality of materials, the plurality of materials are divided into a plurality of material subgroups, and each material group includes at least one material;

a scheduling list module configured to establish and output a first scheduling task list according to the process recipes and the material list, wherein the first scheduling task list includes a plurality of material scheduling task groups, the plurality of material groups has a one-to-one correspondence with the plurality of material scheduling task groups, each material scheduling task group includes a plurality of material scheduling task subgroups, the plurality of material groups has a one-to-one correspondence with the plurality of material scheduling task subgroups, and each material scheduling task subgroup includes at least one material scheduling task;

a solver configured to input the first scheduling task list to a solver to calculate and output an optical scheduling result with a shortest time required for performing all material scheduling tasks in the first scheduling task list and parse the optical scheduling result to obtain a movement sequence of all the materials;

the scheduling list module further configured to:

select a determined number of material scheduling task subgroups from the first scheduling task list according to a first predetermined rule to form a second scheduling task list; and delete the selected material scheduling task subgroups from the first scheduling task list;

the solver further configured to:

receive the second scheduling task list, calculate and output a local scheduling result with shortest time required for performing all material scheduling tasks in the second scheduling task list by the solver, and parse the local scheduling result to obtain a sub-movement sequence of all materials in the second scheduling task list;

the scheduling list module further configured to:

set an ending time point corresponding to a material scheduling task subgroup that finishes first in the local scheduling result as a feeding time point, select a portion of the sub-movement sequence before the feeding time point as an output sequence, and store the output sequence;

determine whether a material scheduling task subgroup remains in the first scheduling task list, if the material scheduling task subgroup remains, delete the material scheduling task subgroup that finishes first from the second scheduling task list, according to a second predetermined rule, re-select a material scheduling task subgroup from the first scheduling task list and insert the re-selected material scheduling task subgroup into the second scheduling task list, and then return to deleting the selected material scheduling task subgroups from the first scheduling task list, and if the material scheduling task subgroup does not remain, combine the current sub-movement sequence and all previously stored output sequences into the movement sequence.

* * * * *